United States Patent [19]

Kurelek

[11] Patent Number: 5,794,674
[45] Date of Patent: Aug. 18, 1998

[54] TREE FELLING DISC SAW HELD WITH LARGE ACCUMULATION AREA

[75] Inventor: John Kurelek, Brantford, Canada

[73] Assignee: Tigercat Industries Inc., Brantford, Canada

[21] Appl. No.: 886,159

[22] Filed: Jun. 30, 1997

[51] Int. Cl.⁶ .................................................. A01G 23/08
[52] U.S. Cl. .................. 144/34.1; 83/840; 144/4.1; 144/336
[58] Field of Search ................... 144/4.1, 24.13, 144/34.1, 335, 336, 337, 338; 83/835, 840, 841, 842, 843, 844; 56/255, 295, DIG. 17; 407/33

[56] References Cited

U.S. PATENT DOCUMENTS

| | | | |
|---|---|---|---|
| 3,910,326 | 10/1975 | Tucek | 144/34.1 |
| 4,446,897 | 5/1984 | Kurelek | 144/34.1 |
| 4,653,555 | 3/1987 | Mellgren | 144/4.1 |
| 4,727,916 | 3/1988 | Sigouin | 144/4.1 |
| 4,909,291 | 3/1990 | Tremblay | 144/4.1 |
| 4,987,935 | 1/1991 | Corcoran et al. | 144/4.1 |
| 5,004,026 | 4/1991 | MacLennan et al. | 144/4.1 |
| 5,113,919 | 5/1992 | MacLennan | 144/4.1 |
| 5,303,752 | 4/1994 | MacLennan | 144/34.1 |
| 5,377,731 | 1/1995 | Wildey | 144/34.1 |
| 5,697,412 | 12/1997 | Kurelek | 144/4.1 |

Primary Examiner—W. Donald Bray
Attorney, Agent, or Firm—R. Craig Armstrong

[57] ABSTRACT

The felling and accumulating head has a large accumulation area for trees, obtained by elevating the accumulation area to extend outwardly and rearwardly over the teeth of the saw. Trees are swept from the front severance area, up a small ramp into the accumulation area, by a taker arm, and are retained there by a tucker arm. The taker and tucker arms pivot preferably on the same axis, on the opposite side of the head from the accumulation area, and sweep over the saw motor, to sweep trees a substantial distance rearwardly, i.e. at least beyond an imaginary lateral line through the saw axis. The butt plate is recessed beneath the top of the saw kerf, which permits the head to be angled forward slightly for continuous advancement from one tree to the next.

18 Claims, 10 Drawing Sheets

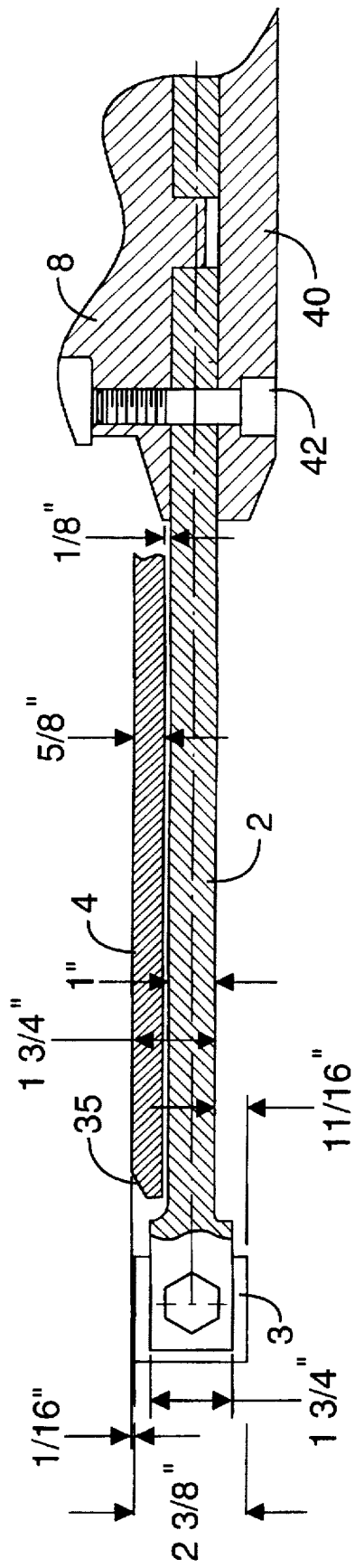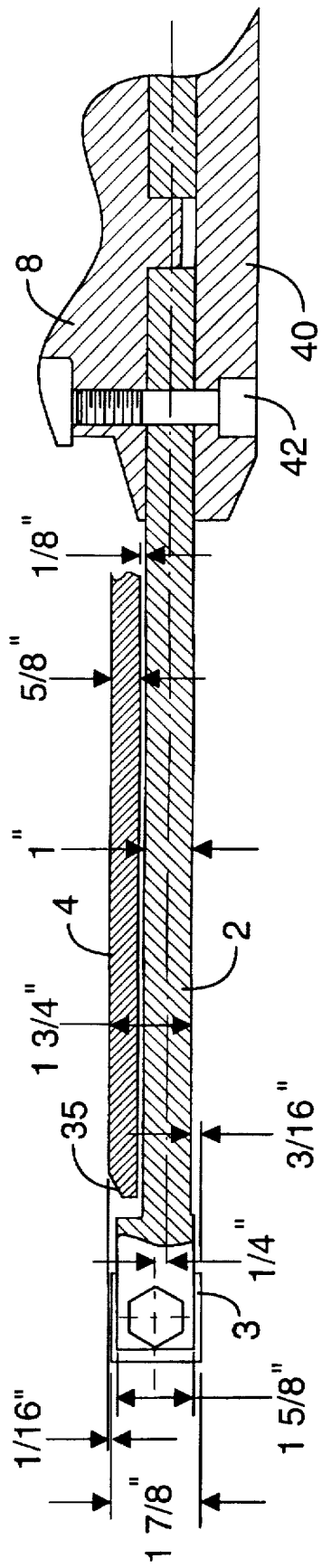

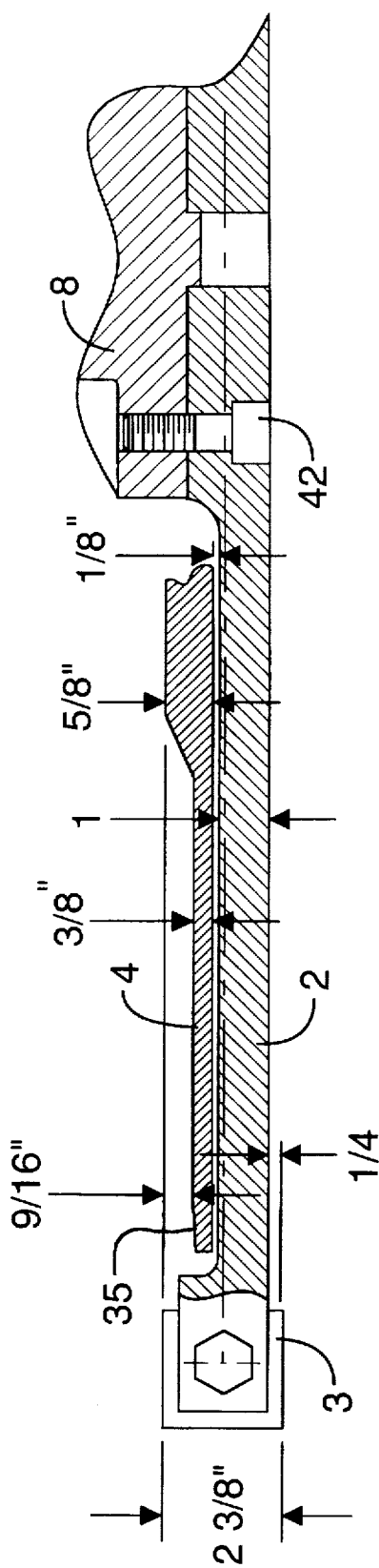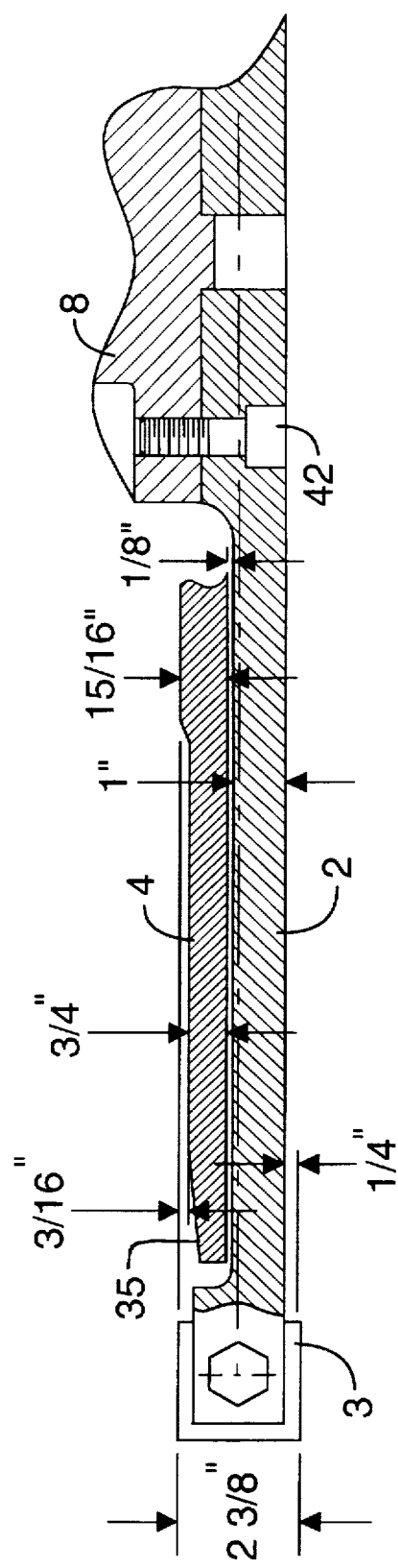

TREE FELLING DISC SAW HELD WITH LARGE ACCUMULATION AREA

BACKGROUND OF THE INVENTION

This invention relates to disc saw heads for tree felling.

In laid-open Canadian patent application no. 2,143,155, the present inventor explained the desirability of being able to store full severance size trees, i.e. trees of the maximum size severable by the severance means, in a position totally clear of the severance area at the front of the head. In that application, trees were stored in an accumulation area to one side and to the rear of the center line of a shear, and were swept from the severance area to the accumulation area by taker and tucker arms which pivoted from the opposite side of the center line.

In the application, it was contemplated that severance means other than a shear could be used. However, in order to make optimum use of some of the principles of the prior invention, it has been realized further innovations were desirable.

Examining the geometry and relative dimensions of a disc saw and its maximum tree diameter cutting capacity reveals some inescapable design restrictions. If the maximum diameter tree to be cut (without restoring to multiple cuts) is say 22 inches, and if the motor or saw hub has a diameter of say 14 inches, then the diameter of the saw disc has to be at least 58 inches, i.e. 22 inches plus 14 inches plus 22 inches. Add to this a protective housing with some clearance for wood chip escape, and a head more than 5 feet wide at its base would have to be carried around, which is greater than desirable, taking into account various factors including frequently limited space between adjacent trees.

Thus when designing a disc saw head where a large tree accumulation capacity is desired, it is not sufficient to simply increase the diameter of the disc beyond what is dimensionally needed to sever the tree, since this produces an excessively large head. Instead, it is preferable to make the saw just big enough to get through the largest desired tree, and then try to use whatever storage space can be found. Typically in the prior art, this has meant using the severance space and additional space on the surface of the disc.

However, the amount of additional space that others have had available to them, prior to present invention, had been hindered by the essential construction and operating manner of such disc saws. In U.S. Pat. Nos. 5,377,731 (Wildey) and 5,303,752 (MacLennan), it is apparently assumed that severed trees should only be supported on a butt plate (which covers the inner saw disc), and not on the rim which consists of the sides of the cutting teeth. This is so that neither tossing nor burning contact between the tree butt and the disc and tooth top surfaces occurs. MacLennan makes some extraordinary effort to make a slightly larger radius butt plate than some others have, so that more trees will fit onto it. Both patents show the top edge of the teeth only barely high enough to cut a path for the butt plate.

Conventional butt plates are sunk into the top of disc saws, and thus are confined to radii always less than the saw radius, by the radial dimension of the teeth and their rim. Thus in the above example if 3 inches was used for the rim and teeth, then a maximum stored tree diameter which is 3 inches less than the severance size, i.e. only 19 inches instead of 22 inches would have to be accepted. This would not meet the inventor's desire to store a full size tree separate from the severance space.

A related problem in the prior art is that conventional butt plates, because of the height of their upper surfaces relative to the saw kerf, do not permit the saw disc to be angled slightly forwardly to facilitate continuous cutting, without the butt plate wedging down onto the saw disc, which is clearly undesirable for obvious reasons. This will be explained in greater detail below.

SUMMARY OF THE INVENTION

It is thus an object of the invention to provide an improved disc saw tree felling head, with a large accumulation area or storage pocket for trees, which is not limited in size specifically by the saw disc diameter. Preferably, the accumulation area is located rearwardly and to one side of the head.

Preferably, the tree accumulation area is large enough to accept a tree of the full size severable by the saw, totally additional to the area provided for severing the tree from its stump.

In the invention, the large accumulation area is obtained by sweeping the butts of the severed trees up an inclined ramp that leads from the butt plate level in the severance area, i.e. the exposed area at the front of the saw, up to the level of a higher bottom plate of the accumulation area. The bottom plate of the tree accumulation area is just high enough for its bottom surface to extend over the saw teeth in operation. Thus the tree accumulation area location is not restricted to the area above the saw disc, and can be optimally located and shaped to suit center of gravity preferences and taker and tucker arm geometry needs. The accumulation area preferably is far enough from the severance area that a full size tree can be totally severed and then swept away from the severance area and up the ramp to the accumulation area. Trees that are smaller than full size are, after severance, first slid along a lower level butt plate before being swept up the ramp into storage. The ramp should not encroach on the tree severance space, so that in general, trees are not lifted until they are completely severed.

Preferably, the accumulation area extends a significant distance rearwardly from the severance area on one side of the head, i.e. well beyond an imaginary lateral line through the saw axis. Taker and tucker arms are pivotally mounted on the other side of the head, configured so as to sweep trees from the severance area into the accumulation area. To maximize the distance by which the accumulation area may extend rearwardly, the motor and hub over the center of the saw disc are configured with a low profile, and the taker and tucker arms are configured to pivot over the motor and hub, thus enabling them to sweep farther rearwardly than if blocked by the motor and hub.

The configuration of the invention permits a much larger tree accumulation area than has been possible in the prior art. Trees are accumulated principally in the accumulation area, and should not encroach on the severance area, although in practice larger trees in particular may project somewhat forwardly from the accumulation area, though preferably without encroaching on the severance area and without resting on the butt plate.

The invention also permits the use of a thinner butt plate than is conventional, with its upper surface lower or no higher than the upper plane of the saw kerf. This permits the saw disc to be angled slightly forwardly to facilitate continuous cutting, as will be explained in greater detail below.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which:

FIGS. 16A to 16D are various alternative cross-sections each showing the saw disc, a saw tooth, and the butt plate, FIGS. 16A and 16B being prior art.

DETAILED DESCRIPTION OF THE PREFERRED EMBODIMENT

Figure 1:
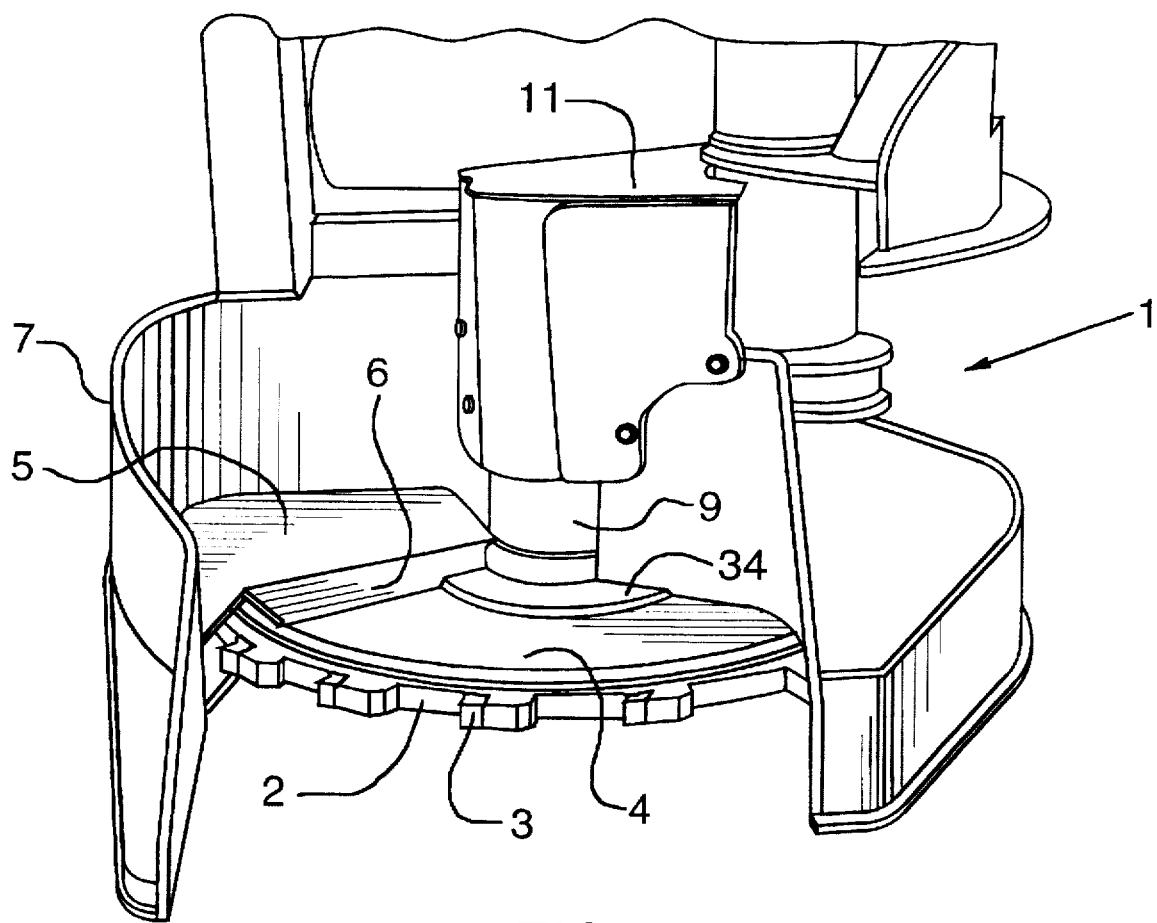
FIG. 1 is a perspective view of the disc saw and its housing.
Figure 2:
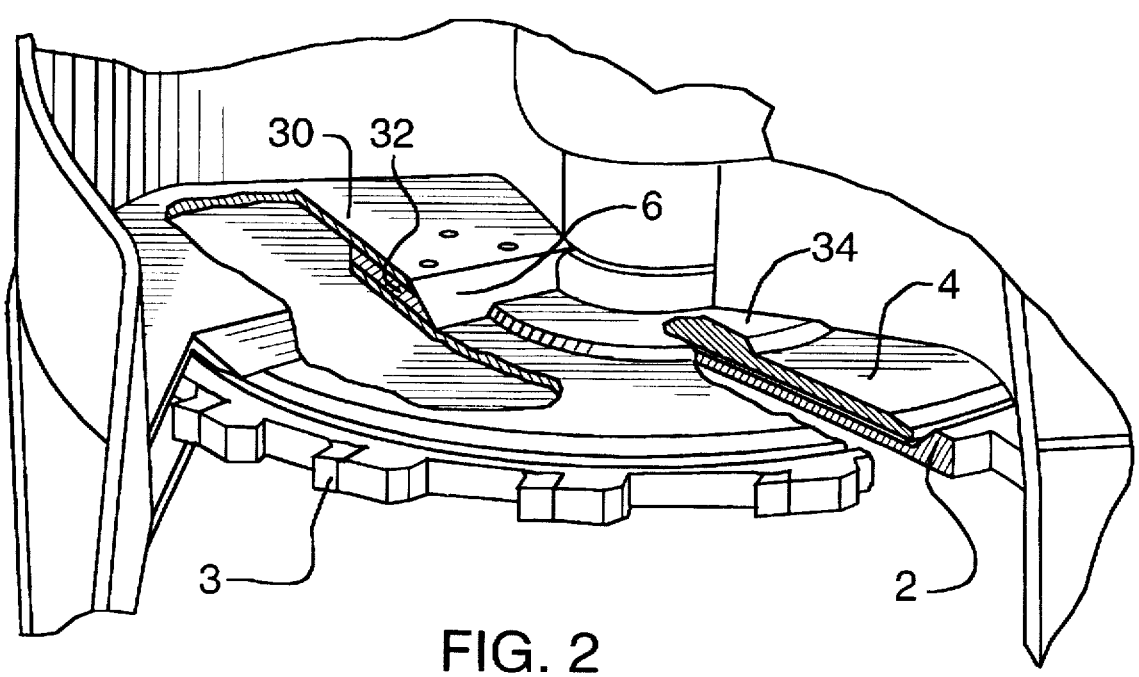
FIG. 2 is a cutaway perspective view of the saw and its housing, corresponding to FIG. 1.

FIGS. 1 and 2 show the lower portion of the feller head 1, which includes a disc saw 2 with teeth 3, a butt plate 4 just above the upper surface of the disc saw, an accumulation area 5 separated from the butt plate by a ramp 6, and a protective skirt 7. The disc saw is mounted beneath a spindle 8 hidden behind a protective housing 9, and is driven by a motor 10 hidden behind a protective housing 11. These components will be described in greater detail below.

Figure 3:
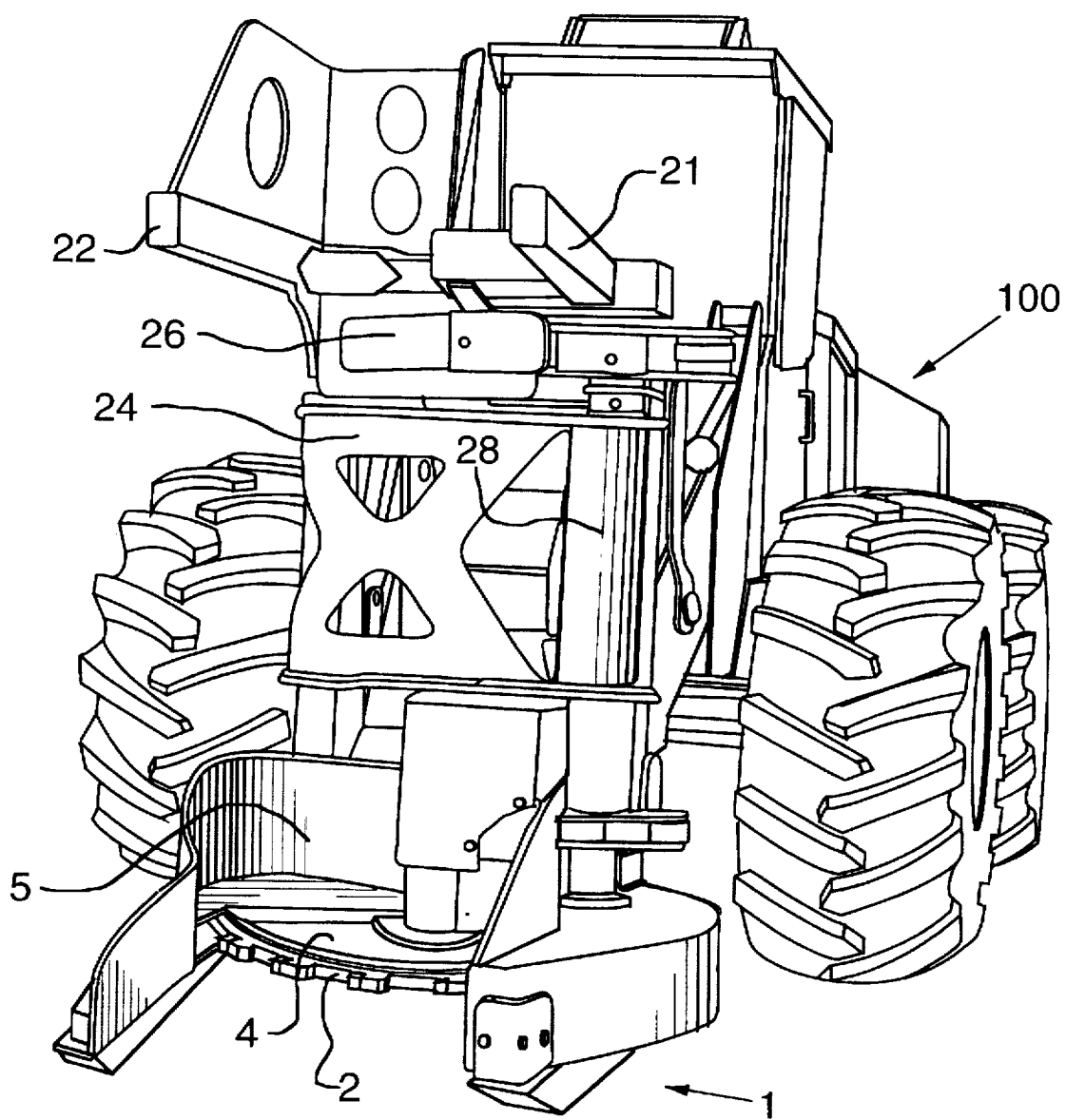
FIG. 3 is a perspective view of the saw head mounted on a carrier.

As seen in FIG. 3, the head 1 is carried on a frame attached to the front of a typical carrier or logging vehicle 100. The attachment is essentially conventional, and virtually identical to that described in the above-mentioned Canadian application. Essentially, the frame includes two vertical members 20 which each have upper and lower mounting flanges 21 for mounting to the conventional hydraulically-actuated vehicle-mounted linkage which allows the head to be raised and lowered, moved up and down, and tilted relative to the vehicle. Side to side motion and pivoting about a vertical axis are not necessary or provided in the illustrated embodiment, although full ranges of motion are provided when the head is boom mounted. Thus in general, "forward" and "rearward" in this specification are with respect to the head itself and its direction of advancement not necessarily with respect to the vehicle.

The frame includes two generally horizontal horns 21 and 22 which project forwardly to define an upper pocket above the accumulation area 5, to hold the trees in a generally vertical position, or preferably angled slightly inwardly. As in the above-mentioned Canadian patent application, taker and tucker arms 24 and 26 respectively are preferably mounted on a single pivot axis 28 on the opposite side of the vehicle and feller head center line from the accumulation area 5.

Figure 4:
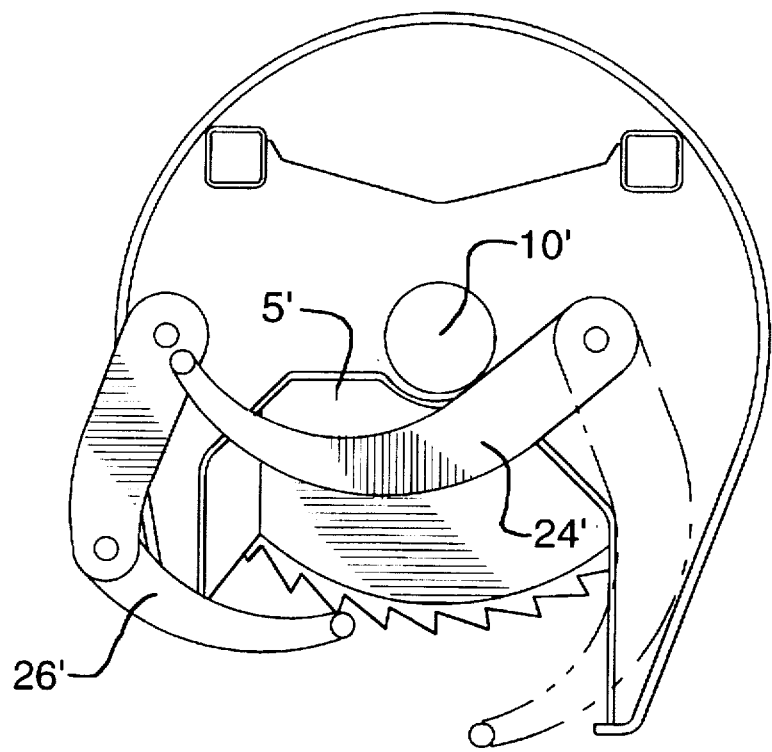
FIG. 4 is a plan view of a typical prior art accumulation area and taker and tucker arms.

FIG. 4 shows a typical prior art arrangement, with a small accumulation area 5' and taker and tucker arms 24' and 26' on opposite sides of the center line. Either or both of the taker and tucker arms typically are blocked by the motor 10', and thus can only rotate as far as the position shown in FIG. 4, i.e. trees can only be pushed rearwardly to a very limited degree.

Figure 5:
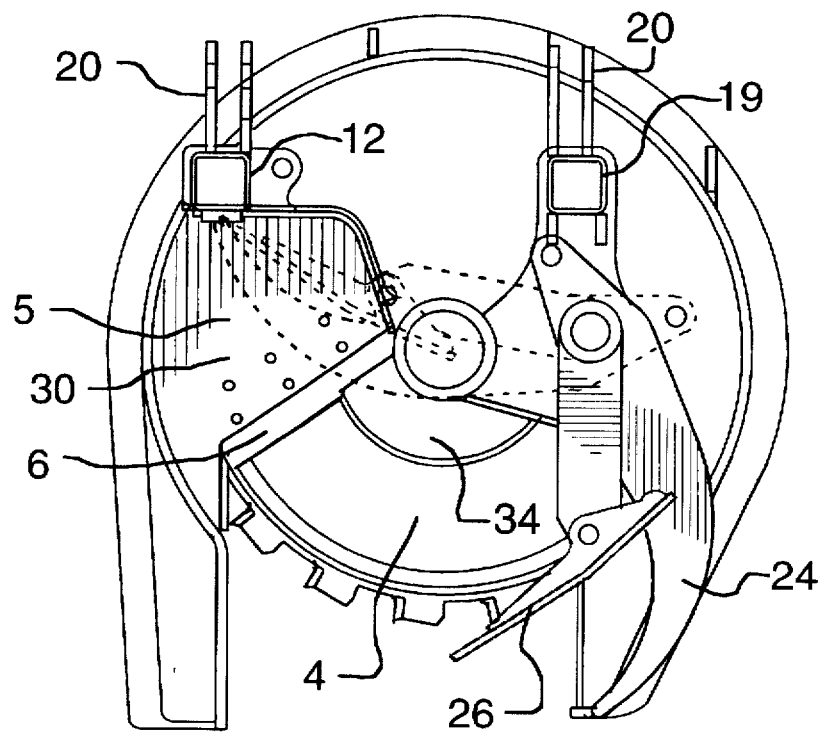
FIG. 5 is a plan view of the preferred embodiment, showing the taker and tucker arms.
Figure 6:
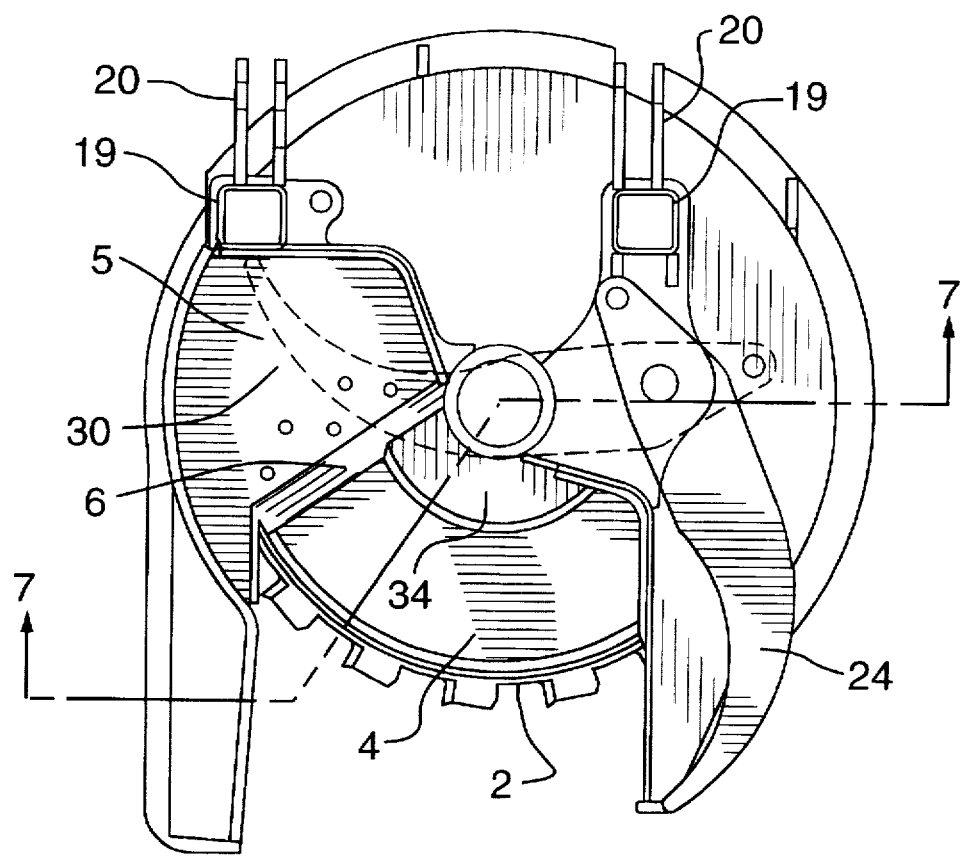
FIG. 6 is a plan view of the preferred embodiment, showing just the taker arm.
Figure 7:
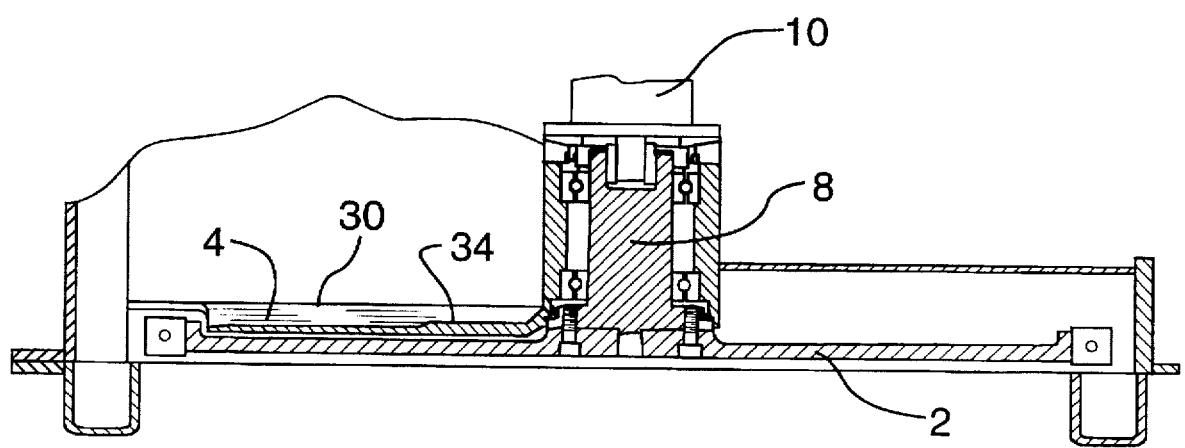
FIG. 7 is a cross-sectional elevation view, at 7—7 of FIG. 6.
Figure 8:
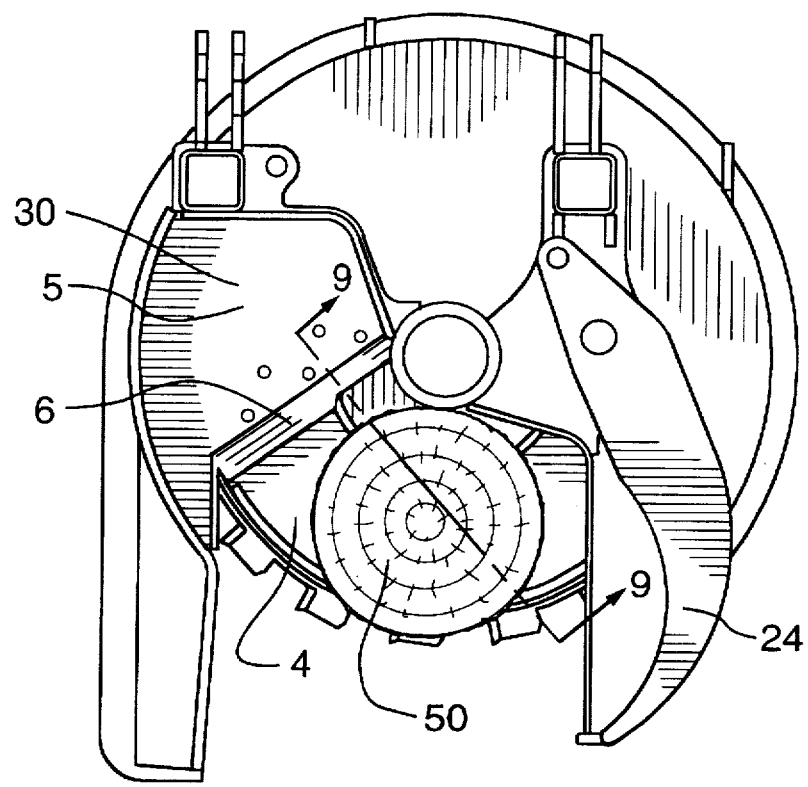
FIG. 8 is a plan view of the preferred embodiment, showing a large tree just severed.
Figure 10:
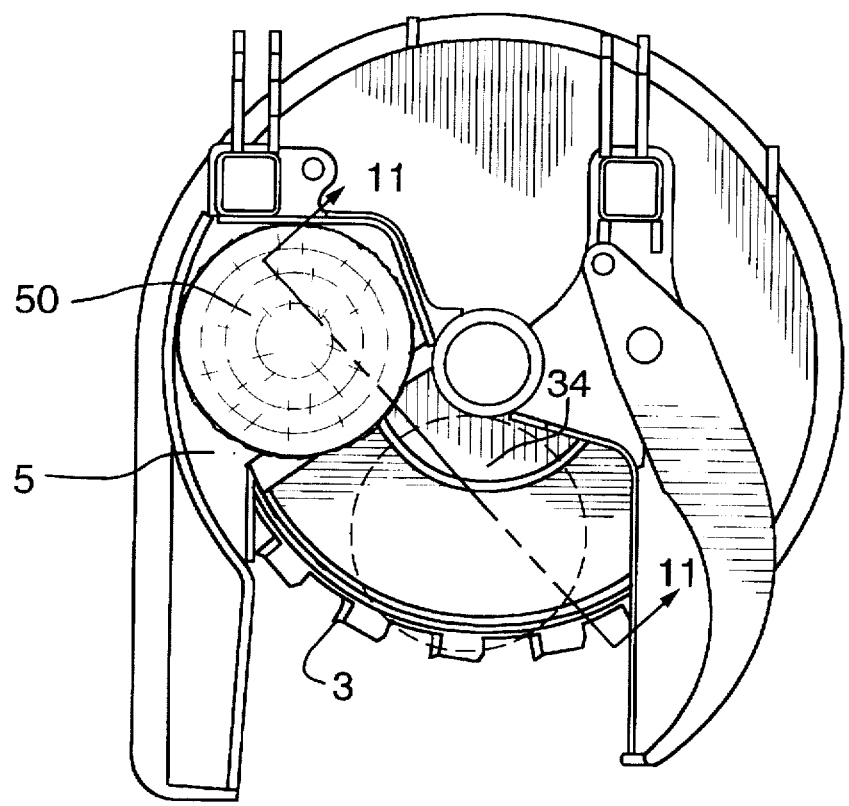
FIG. 10 is a plan view of the preferred embodiment, showing a large tree stored in the accumulation area.

By contrast, in the present invention the taker and tucker arms preferably are on the same side of the center line, namely the side opposite the accumulation area. In FIGS. 6, 8 and 10, only the taker arm 24 is shown, for greater clarity. The tucker arm 26 is shown only in FIGS. 3 and FIG. 5. In the invention, both the taker arm and the tucker arm can pivot over the motor, as shown in FIG. 5. This could be accomplished by having a taker arm which is quite high, but preferably is accomplished by virtue of a shorter than conventional spindle being used. This ability of the taker and tucker arms to pass over the motor is a significant feature, in that it permits trees to be tucked back much farther than would be the case if the arms were blocked by the motor.

However, it should be clearly understood that in its broadest sense, the invention relates to the enlarged accumulation area which extends substantially beyond the inner circumference of the saw tooth rim, which is the limit in the prior art. This concept could be employed with conventional taker and tucker arm configurations such as those of the FIG. 4 type and others, and could be employed whether or not the taker and tucker arms sweep over the motor, although not with the optimum results achieved by the preferred embodiment.

As soon as the first tree is severed, the taker arm 24 is actuated by the operator to sweep the base of the severed tree to the rear of the accumulation area 5. The operator then positions the tucker arm 26 against the tree, to hold the tree in place in the accumulation area. The operator then retracts the taker arm and severs another tree, and then actuates the taker arm to sweep the tree to the accumulation area. The sequence continues, until the accumulation area is filled, whether by a single large tree or by a number of small trees. This operation of takers and tuckers generally is well known, although pivoting the taker and tucker from the same side of the center line was new in the above-mentioned Canadian patent application. The advantages of pivoting both arms from the side opposite the accumulation area are well described in the Canadian patent application, and include for example the fact that both arms then present substantially similar geometries to the tree bundle or "bouquet", both at rest and in motion, to minimize post-capture jostling of the bouquet.

Being able to sweep the taker and tucker arms over the motor is significant, but that feature in itself would not be sufficient to create a large accumulation area. The large accumulation area 5 in the invention is obtained by extending the area out over the teeth of the saw, as well as to the rear. This is achieved by sweeping the butts of the severed trees up an inclined ramp 6 that leads from the butt plate level in the severance area up to the level of a higher bottom plate 30 of the tree accumulation area 5. This is perhaps most clearly seen in FIGS. 1 and 2. The bottom plate of the tree accumulation area is just high enough for its bottom surface to extend over the saw teeth in operation. Thus the tree accumulation area location is not restricted to the area above the saw disc, and can be optimally located and shaped to suit center of gravity preferences and taker and tucker arm geometry. The accumulation area is far enough from the severance area that a full size tree can be totally severed and then swept away from the severance area and up the ramp to the accumulation area. Trees that are smaller than full size are, after severance, first slid along the butt plate 4 before being swept up the ramp into storage. The ramp should not encroach on the tree severance space, so that in general, trees are not lifted until they are completely severed.

Figure 9:
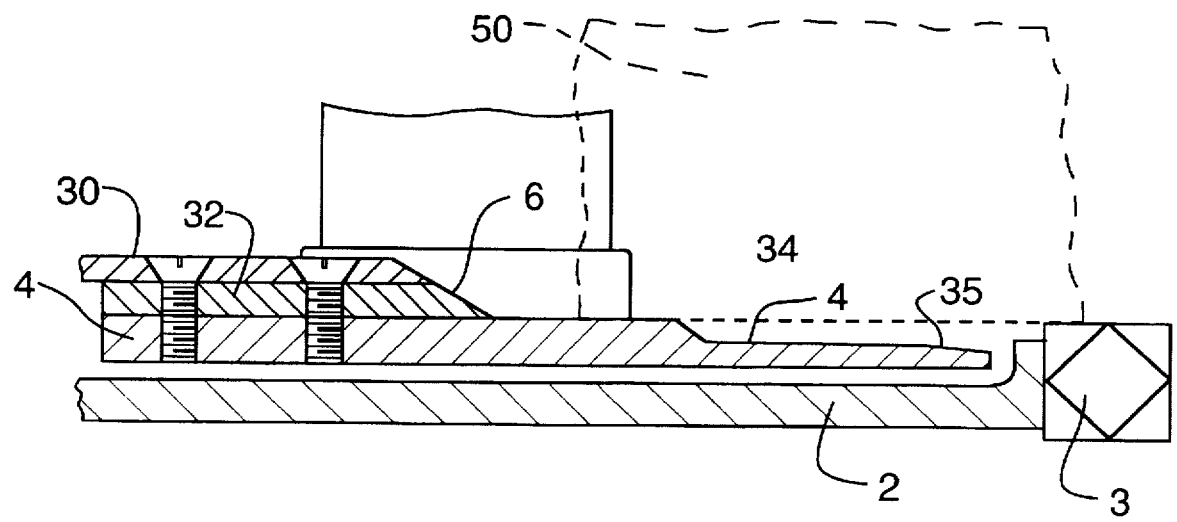
FIG. 9 is a cross-sectional elevation view, at 9—9 of FIG. 8.
Figure 11:
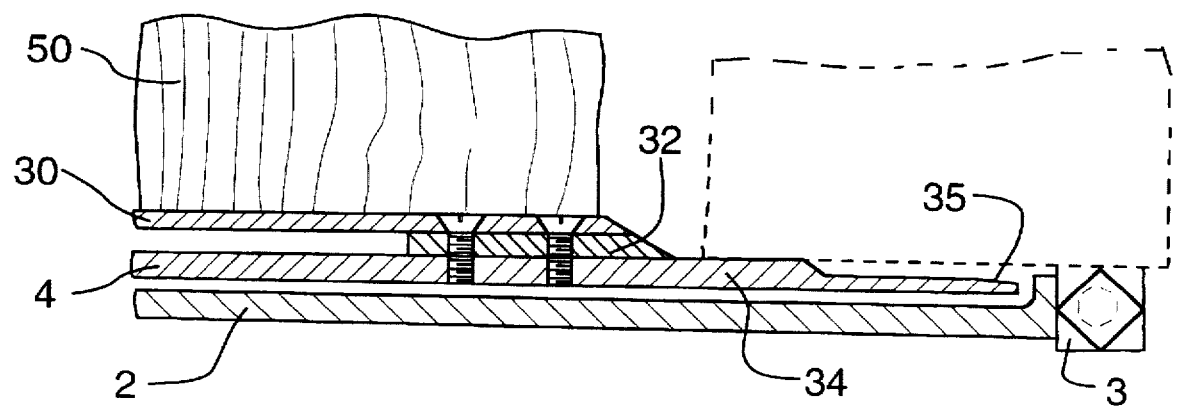
FIG. 11 is a cross-sectional elevation view, at 11—11 of FIG. 10.
Figure 12:
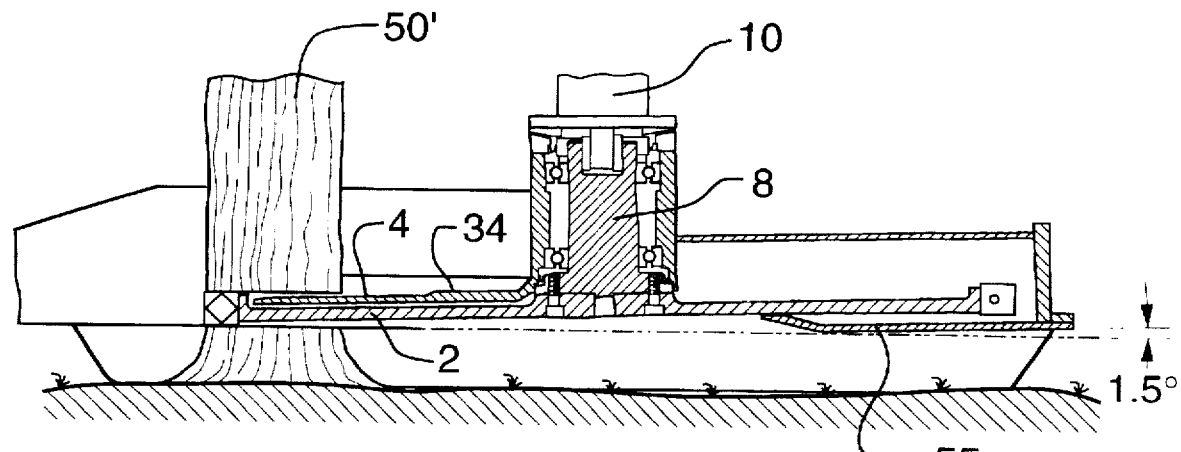
FIG. 12 is a cross-sectional elevation view, showing the saw completely through a small tree, with the disc tilted at about 1.5 degrees so as to be able to clear the stump as the saw moves forward horizontally.
Figure 13:
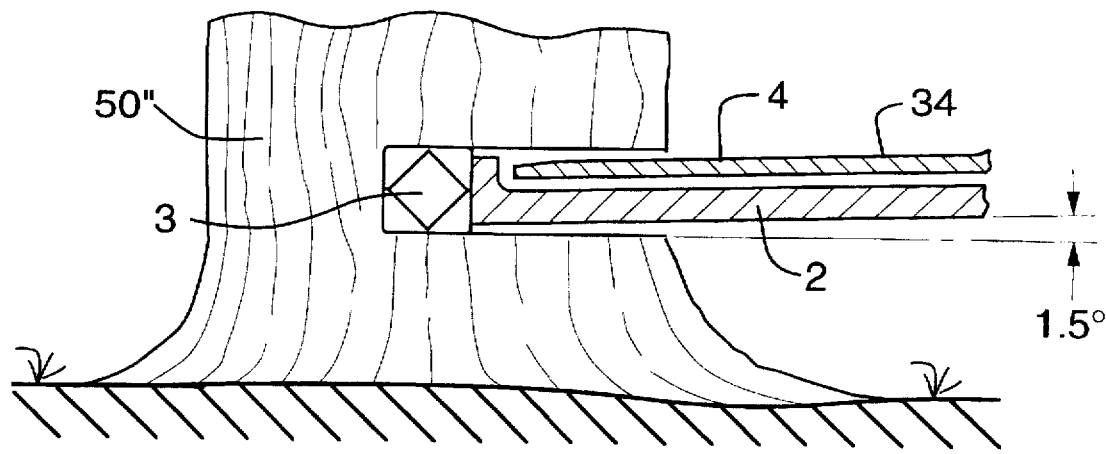
FIG. 13 is a cross-sectional elevation view, showing the saw being fed horizontally through a medium-sized tree.
Figure 14:
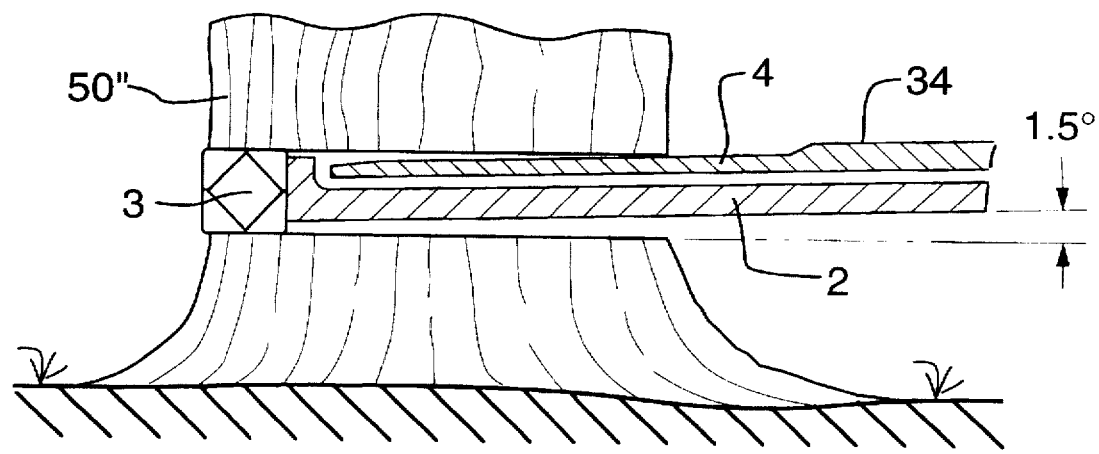
FIG. 14 is a cross-sectional elevation view corresponding to FIG. 13, showing the saw fully through the medium-sized tree.
Figure 15:
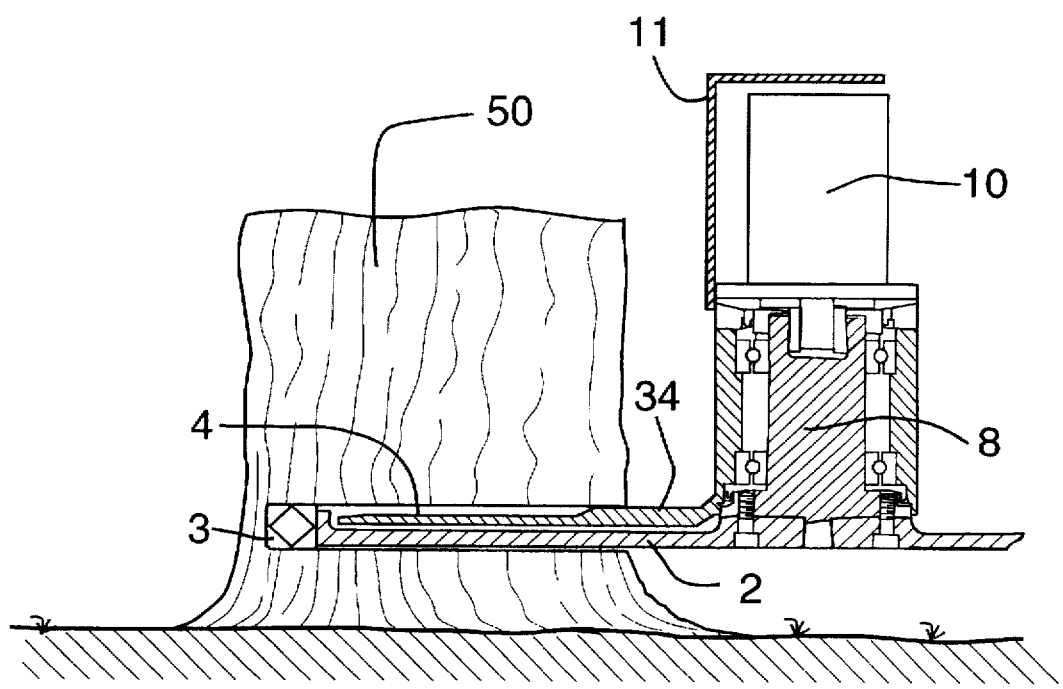
FIG. 15 is a cross-sectional elevation view, showing the saw almost fully through a large-sized tree.

As can be seen from FIG. 9, the ramp 6 in the preferred embodiment is actually defined by a spacer 32 and the bottom plate 30 of the accumulation area, these together being bolted (or otherwise secured) to the butt plate 4. The butt plate itself has a raised inner portion 34, by virtue of the outer portion being machined down to create a thinner than conventional butt plate. Only large trees will contact the raised inner portion before being severed. FIG. 10 shows a large tree 50 in the accumulation area 5, with there still being room to sever and accommodate a second large tree to rest on the raised inner portion of the butt plate, as can be seen in FIG. 11. As can be seen in FIG. 12, a small tree 50' will be severed before coming into contact with the raised inner portion of the butt plate. FIGS. 13 and 14 show that a medium-sized tree can be cut with the head moving forward horizontally, with the head and the saw disc at a 1.5 degree angle relative to the horizontal, with the butt of the tree coming into contact with the butt plate only at the point of severance, due to the clearance above the butt plate which the invention provides. FIG. 15 shows a large tree 50 being supported on the raised inner portion before being severed.

The raised inner portion 34 in the preferred embodiment is by virtue of the outer portion being machined down to create a thinner than conventional butt plate. This thinner butt plate is a particularly advantageous feature of the invention, and is made possible by the fact that the trees are not stored on the butt plate, but rather are stored in the separate accumulation area. This means that the butt plate does not have to be designed to support the trees for storage, which means that at least the outer portion thereof can be made thinner. In conventional disc saws with butt plates, the combined thickness of the saw disc, the butt plate and the limited clearance space between them often results in the butt plate being forced down onto the saw disc if the saw and its forward movement are not completely level. About the best that the prior art has been able to accomplish is positioning the top of the butt plate at the same level as the top of the kerf, i.e. in line with the top of the saw tooth or teeth, as shown in FIGS. 16A and 16B. In the invention, as shown in FIG. 16C, it is possible to remove ¼ inch from the thickness of the main body of the butt plate, i.e. from the conventional ⅝ inch down to ⅜ inch, creating a butt plate which is sunken 9/16 inch below the kerf. In FIG. 16D, an alternative embodiment, it is shown that even with a very strong 15/16 inch butt plate, the present invention can provide a butt plate which is still ¾ inch at the reduced area and 3/16 inch below the kerf.

(Note that the kerf could be created by teeth which are co-planar, or, as is known in the prior art, by upper and lower edges respectively of teeth which alternately project slightly upwardly and downwardly relative to each other.)

The advantage of this can be seen most clearly in FIGS. 13 and 14, showing the cutting of a medium sized tree 50".

As can be seen in FIG. 12, the saw disc can be angled slightly, at 1.5 degrees for example, which is sufficient to avoid friction between the bottom of the saw disc and the tree stump. In the prior art, this would result in the portion of the tree above the butt plate bearing against the butt plate, and wedging down onto the saw disc. However, in the invention, as can be seen in FIGS. 13 and 14, there is essentially no contact between the tree and the butt plate until the tree is severed. As can be seen in FIG. 12, a small tree 50' can be fully severed without the butt plate coming into contact with the upper portion of the tree at all. Furthermore, the 1.5 degree angle is sufficient for the "stump jumper" 55 at the back of the head to clear the stump, thus permitting the operator to move continuously forward from tree to tree without necessarily having to raise the head after each cut.

In summary, the preferred embodiment of the invention provides an improved disc saw felling head by providing a large accumulation area extending rearwardly and outwardly over the saw teeth, by virtue of a ramp up from the butt plate level. The taker and tucker arm configuration, particularly in combination with the relatively low motor and spindle, make it possible for trees to be swept all the way back into the back of the accumulation area. The separate accumulation area permits a thinner butt plate to be used, such that it can be recessed beneath the top of the kerf, with the advantages just described above. The recessing can be achieved even if the butt plate is not thinner than in the prior art, and thus is not dependent on the presence of a separate accumulation area, although that is preferable.

The separate accumulation area reduces loading of the butt plate so that in some cases, especially those involving light duty, a thinner butt plate can be used. In heavy tree work, a full-thickness butt plate is preferable, and will work well in combination with the large accumulation area, and will have a long service life.

When a thickness of butt plate is used that provides a clearance above the butt plate relative to the saw kerf, then the head offers tilt-angle, stump-clearing, felling-on-the-go advantages. By reducing the thickness of the butt plate, these advantages would be available on any saw which did not try to store trees on the saw rim, i.e. where the butt plate only was used for storage.

What is claimed as the invention is:

1. A disc saw tree felling and accumulating head for attachment to a logging vehicle, comprising:

a support frame securable to said vehicle for controlled motion relative thereto;

a circular saw rotatably mounted on said support frame about a generally vertical saw axis for rotation in a generally horizontal plane adjacent the bottom of said head, said saw comprising a saw disc and a number of spaced-apart teeth secured at the circumference of said saw disc, uppermost and lowermost edges of said teeth defining a saw kerf, an exposed front portion of said saw constituting a tree severance area;

a butt plate overlying said saw disc in said severance area, radially inward from said teeth;

an accumulation area for accumulating trees severed by said saw, said accumulation area being at a slightly higher elevation than said butt plate, separated therefrom by a ramp up therefrom, said accumulation area extending above and substantially beyond the circumference of said saw and said teeth, outwardly from said saw axis on one side thereof;

a motor mounted on said frame above said saw disc, connected to drive said saw; and taker and tucker arms pivotally mounted on said frame to sweep trees from said severance area into said accumulation area.

2. A head as recited in claim 1, where said accumulation area extends a substantial distance rearwardly from said severance area, namely at least beyond a lateral line through said saw axis.

3. A head as recited in claim 1, where said taker and tucker arms are pivotally mounted on pivot axes on the side of said saw axis opposite the side having said accumulation area.

4. A head as recited in claim 2, where said taker and tucker arms are pivotally mounted on pivot axes on the side of said saw axis opposite the side having said accumulation area.

5. A head as recited in claim 3, where said pivot axes are substantially the same.

6. A head as recited in claim 4, where said pivot axes are substantially the same.

7. A head as recited in claim 4, where said motor is low enough and said arms are high enough to be pivotable over said motor and said saw axis to sweep trees into said accumulation area.

8. A head as recited in claim 7, where said pivot axes are substantially the same.

9. A head as recited in claim 1, where at least an outer portion constituting a substantial overall portion of said butt plate has its upper surface below the upper plane of said saw kerf.

10. A head as recited in claim 9, where said butt plate has a radially inner portion which is thicker than outer portions thereof and which has its upper surface above the upper surface of said outer portions.

11. A head as recited in claim 9, where said outer portion is no more than ⅜ inch thick, and at least ⅛ inch below the upper plane of said saw kerf.

12. A head as recited in claim 9, where said outer portion is no more than ⅜ inch thick, and at least 9/16 inch below the upper plane of said saw kerf.

13. A head as recited in claim 9, where said outer portion is no more than ¾ inch thick, and at least ⅛ inch below the upper plane of said saw kerf.

14. A disc saw tree felling and accumulating head for attachment to a logging vehicle, comprising:

a support frame securable to said vehicle for controlled motion relative thereto;

a circular saw rotatably mounted on said support frame about a generally vertical saw axis for rotation in a generally horizontal plane adjacent the bottom of said head, said saw comprising a saw disc and a number of spaced-apart teeth secured at the circumference of said saw disc, uppermost and lowermost edges of said teeth defining a saw kerf, an exposed front portion of said saw constituting a tree severance area;

a butt plate overlying said saw disc in said severance area, radially inward from said teeth, where at least an outer portion constituting a substantial overall portion of said butt plate has its upper surface below the upper plane of said saw kerf;

an accumulation area for accumulating trees severed by said saw;

a motor mounted on said frame above said saw disc, connected to drive said saw;

taker and tucker arms pivotally mounted on said frame to sweep trees from said severance area into said accumulation area.

15. A head as recited in claim 14, where said butt plate has a radially inner portion which is thicker than outer portions thereof and which has its upper surface above the upper surface of said outer portions.

16. A head as recited in claim 14, where said outer portion is no more than ⅜ inch thick, and at least ⅛ inch below the upper plane of said saw kerf.

17. A head as recited in claim 14, where said outer portion is no more than ⅜ inch thick, and at least 9/16 inch below the upper plane of said saw kerf.

18. A head as recited in claim 14, where said outer portion is no more than ¾ inch thick, and at least ⅛ inch below the upper plane of said saw kerf.

\* \* \* \* \*